US012630170B2

(12) United States Patent
Ademane et al.

(10) Patent No.: US 12,630,170 B2
(45) Date of Patent: May 19, 2026

(54) APPARATUSES, SYSTEMS, METHODS, AND TECHNIQUES OF DISTRIBUTED POWERTRAIN PERFORMANCE OPTIMIZATION AND CONTROL

(71) Applicant: Cummins Inc., Columbus, IN (US)

(72) Inventors: Harsha Ravindra Ademane, Indianapolis, IN (US); Kenneth M. Follen, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 779 days.

(21) Appl. No.: 17/815,382

(22) Filed: Jul. 27, 2022

(65) Prior Publication Data

US 2022/0363281 A1 Nov. 17, 2022

Related U.S. Application Data

(63) Continuation of application No. PCT/US2021/013906, filed on Jan. 19, 2021.
(Continued)

(51) Int. Cl.
*B60W 50/06* (2006.01)
*G05B 15/02* (2006.01)
(Continued)

(52) U.S. Cl.
CPC .............. *B60W 50/06* (2013.01); *G05B 15/02* (2013.01); *H04L 67/12* (2013.01);
(Continued)

(58) Field of Classification Search
CPC ......... B60W 50/06; B60W 2050/0083; B60W 2050/065; B60W 2556/45; B60W 30/188;
(Continued)

(56) References Cited

U.S. PATENT DOCUMENTS 8,386,091 B2 2/2013 Kristinsson et al.
2011/0022262 A1 1/2011 Fennel et al.
(Continued)

FOREIGN PATENT DOCUMENTS

WO 2019196094 10/2019

OTHER PUBLICATIONS

Bosch Mobility Solutions: "Battery in the cloud", Retrieved from the Internet: URL:https://www.bosch-mobility-solutions.com/en/products-and-services/mobility-services/battery-in-the-cloud, Aug. 15, 2019, 8 pgs.
(Continued)

*Primary Examiner* — Donald J Wallace
(74) *Attorney, Agent, or Firm* — Taft, Stettinius & Hollister LLP

(57) ABSTRACT

A system includes a powertrain controller operatively coupled with and configured to control operation of a powertrain of a vehicle and for bidirectional communication via a wireless communication path. An optimization engine is configured to determine optimized powertrain operation parameters for the powertrain controller and for bidirectional communication via a second communication path. A channel management engine is configured for bidirectional communication with the powertrain controller via the wireless communication path and for bidirectional communication with the optimization engine via the second communication path, the channel management engine configured to dynamically update a plurality of data channels including a first data channel storing a non-transitory dynamically-updated instance of powertrain operation data received from the powertrain controller, and a second data channel storing a non-transitory dynamically-updated instance of optimized powertrain operation parameters received from the optimization engine.

35 Claims, 3 Drawing Sheets

Related U.S. Application Data

(60) Provisional application No. 62/970,836, filed on Feb. 6, 2020.

(51) Int. Cl.
  *H04L 67/12*      (2022.01)
  *B60W 50/00*      (2006.01)

(52) U.S. Cl.
  CPC ............... *B60W 2050/0083* (2013.01); *B60W 2050/065* (2013.01); *B60W 2556/45* (2020.02)

(58) Field of Classification Search
  CPC ......... G05B 15/02; H04L 67/12; Y02T 10/40; Y02T 10/84
  See application file for complete search history.

(56) References Cited

U.S. PATENT DOCUMENTS

| | | | |
|---|---|---|---|
| 2012/0134328 A1* | 5/2012 | Gauvreau | H04W 60/005 |
| | | | 370/329 |
| 2016/0121823 A1 | 5/2016 | Umscheid et al. | |
| 2017/0306871 A1 | 10/2017 | Fuxman et al. | |
| 2017/0361829 A1 | 12/2017 | Nicholson, IV | |

OTHER PUBLICATIONS

Communication Pursuant to Article 94(3) EPC; European Patent Office; European Patent Application No. Counter EP Application No. 21705741.3, Dated Apr. 26, 2024, 6 pgs.

\* cited by examiner

APPARATUSES, SYSTEMS, METHODS, AND TECHNIQUES OF DISTRIBUTED POWERTRAIN PERFORMANCE OPTIMIZATION AND CONTROL

RELATED APPLICATIONS

The present application is a continuation of PCT Application No. PCT/US21/13906 filed on Jan. 19, 2021, which claims priority to and the benefit of U.S. Application No. 62/970,836 filed Feb. 6, 2020, the disclosures of which are hereby incorporated by reference.

TECHNICAL FIELD

The present disclosure relates to apparatuses, systems, methods, and techniques of distributed powertrain performance optimization and control and apparatuses, systems, methods, and techniques for real-time wireless communication with the powertrain and remote controls execution.

BACKGROUND

A number of proposals for computer-based vehicle powertrain optimization have been made. A number of such proposals are unsuitable for on-powertrain or on-vehicle implementation as their computing resource demands exceed those typically or preferably available on on-powertrain or on-vehicle. Further proposals have been made for communication between a powertrain or vehicle control system and a remote computing resource configured to perform one or more aspects of an optimization. Yet such proposals continue to suffer from a number of shortcomings and disadvantages including those respecting geographic coverage, coordination of data communication, communication latency, data accessibility, and data updating among others. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Unique distributed powertrain performance optimization apparatuses, methods, systems, and techniques are disclosed. Further embodiments, forms, objects, features, advantages, aspects, and benefits of the disclosure shall become apparent from the following description and drawings.

DETAILED DESCRIPTION OF EXAMPLE EMBODIMENTS

Figure 1:
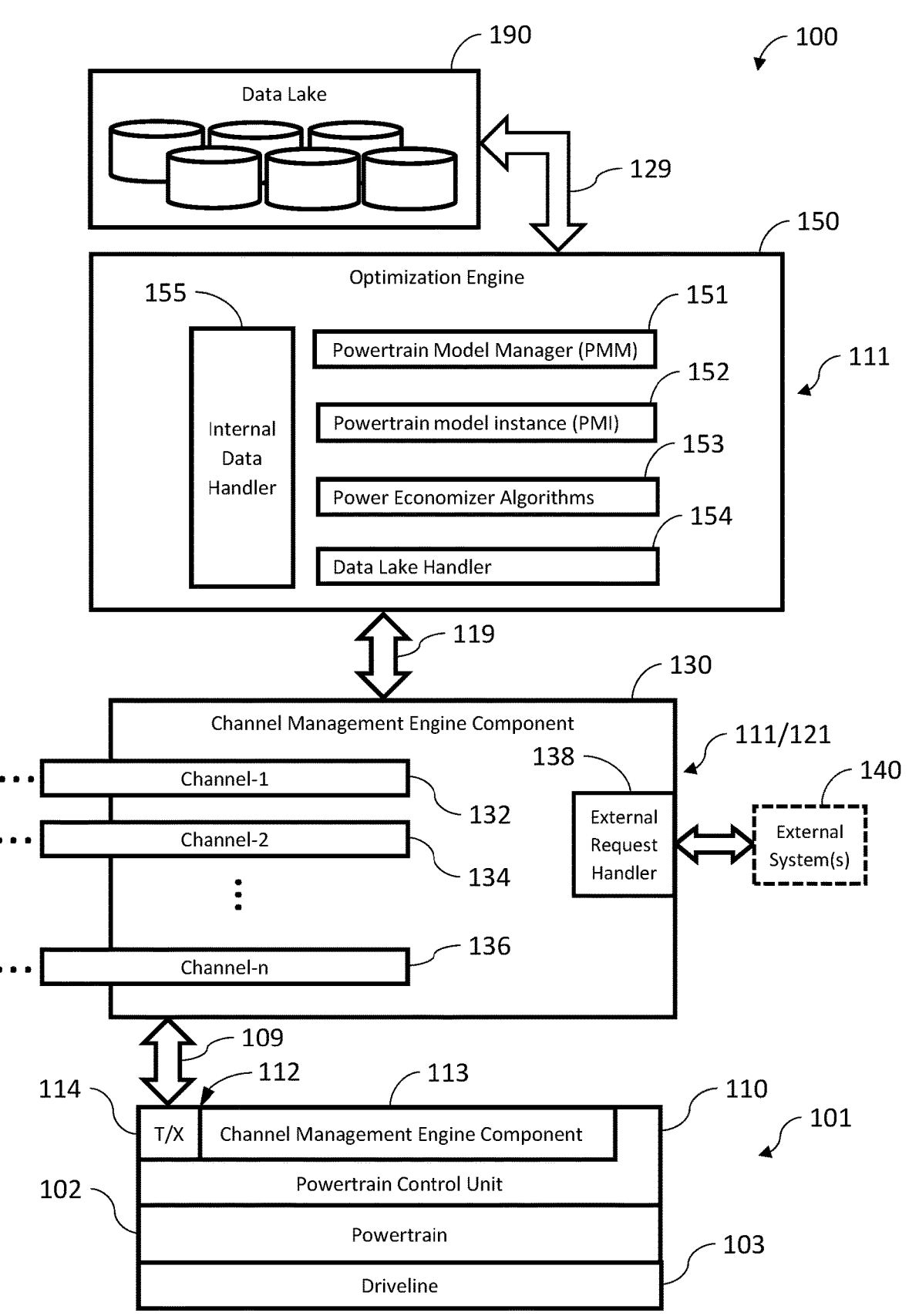
FIG. 1 is a schematic diagram illustrating certain aspects of an example distributed powertrain performance optimization system.

With reference to FIG. 1, there is illustrated an example distributed powertrain performance optimization system 100 which is also referred to herein as system 100. In one aspect of system 100, a powertrain control unit (PCU) 110 is provided in operative communication with a powertrain 102. In the illustrated embodiment, powertrain 102 is configured to power a driveline 103 of a vehicle 101. The powertrain 102 includes a prime mover which may be configured as an internal combustion engine (ICE), a hybrid ICE-electric prime mover system, an electric prime mover system, a fuel cell-based prime mover system, or other types of prime mover systems as will occur to one of skill in the art with the benefit of the present disclosure. In one preferred form, vehicle 101 is provided as an on-highway truck; however, in other forms vehicle 101 may be provided as another type of vehicle as would occur to one of skill in the art with the benefit of the present disclosure.

The PCU 110 is one example of a powertrain controller operatively coupled with and configured to control operation of a powertrain of a vehicle. The PCU 110 is further configured for bidirectional communication via a wireless communication path 109 using a network device 112 which may be configured and provided as a network interface controller or another type of network interface The network device 112 includes a transceiver 114 and can be operatively coupled with the PCU 110 or included as a component of the PCU 110. The network device 112 also includes or is operatively coupled with a channel management engine (CME) component 113 which is configured to manage aspects of the PCU 100 reading data from and writing data to a plurality of data channels 132, 134, 136.

System 100 includes an optimization engine 150 which is provided in a stationary computer system 111 remote from the PCU 110 and is configured to determine optimized powertrain operation parameters for the PCU 110. The optimization engine 150 is further configured for bidirectional communication via a communication path 119. The optimization engine 150 includes a powertrain model manager (PMM) 151 which manages execution of one or more powertrain model instances in the optimization engine 150. The PMM 151 is configured to interfaces with a CME component 130 which is further described below. In embodiments including multiple powertrain model instances, the PMM 151 is configured to assign the correct configuration parameters required for each powertrain model instance.

The optimization engine 150 includes one or more powertrain model instances such as powertrain model instance (PMI) 152. PMI 152 comprises a powertrain model which may be operable to execute in real-time and may be a physics-based model, a map-based model, or another type of model. PMI 153 may be configured to model powertrain parameters such as torque, speed, power response of a powertrain within an acceptable margin of error or accuracy. PMI 152 comprises one instance of a powertrain model that may be triggered or launched in response to requests from the optimization engine 150 and/or the CME component 130 in order to obtain predictive information for a selected powertrain. It is contemplated that certain embodiments may include more than one PMI running at the same time. Each PMI may be configured using powertrain data obtained from an appropriate data channel managed by the CME.

The optimization engine 150 includes one or more power economizer algorithms 153 which are configured to plan a power path (positive and negative) to optimize fuel efficiency by managing one or more of an engine, a battery system, WHR, a fan, an air-conditioner, and an air compressor among other power consumers and producers as well as controlling engine speed and load within the limitations of the drivetrain. The power economizer algorithms 153 may include, for example, a trained neural network configured to classify and plan power paths.

The optimization engine 150 includes an internal data handler which manages or handles the data operations within the optimization engine 150. The optimization engine 150 further includes an external request handler 138 which is configured to manage data communication to and from one or more external systems 140 via the data channels. The external request handler 138 may comprise one or more standardized APIs. The external systems 140 may include mobile platforms and web platforms, among others. Examples of data requests from external systems 140 include a request to provide data to update a graphical user interface elements like a chart or a graph on a web-page, or a request to provide data for system diagnostic purposes. The optimization engine 150 also includes a data lake handler which is configured to manage read/write or data in/out of data lake 190 via communication path 129 which is the big-data storage system. Data lake 190 is an example of a big-data-storage system which stores channel data outside of the run time environment of the optimization engine 150.

The system 100 includes a channel management engine (CME) component 130 which is provided in at least one of the stationary computer system 111 and a second stationary computer system 121 which is also remote from the powertrain controller 130. The CME component 130 is configured for bidirectional communication with the powertrain controller 120 via the wireless communication path 109 and for bidirectional communication with the optimization engine 150 via the communication path 119. It shall be appreciated that communication between PCU 110 and channel maintenance engine component 130 via wireless communication path 109 may further include communication over one or more additional communication paths which may be wired or wireless and is not limited to communication occurring exclusively over communication path 109 or exclusive of communication via additional communication paths unless specifically so indicated. It shall likewise be appreciated that communication between PCU 110 and optimization engine component 150 via communication path 119 may also include communication over one or more additional communication paths which may be wired or wireless and is not limited to communication occurring exclusively over communication path 119 or exclusive of communication via additional communication paths unless specifically so indicated.

The CME component 130 is configured to dynamically update a plurality of data channels including at least a first data channel 132 data channel storing a non-transitory dynamically-updated instance of powertrain operation data received from the powertrain controller 130, and a second data channel 132 storing a non-transitory dynamically-updated instance of optimized powertrain operation parameters received from the optimization engine 150. It shall be appreciated that the CME component 130 may be assisted in such operation other CME components such as CME component 113 or other CME component instances. In certain forms, the plurality of data channels may also include one or more additional data channels 136. The plurality of data channels may have a number of attributes concerning the communication, sharing, and maintenance of the foregoing and other types of data or information as further described herein.

The plurality of channels 132, 134, 136 may reside in part or in whole in the same stationary computer system 111/121 as the CME component 130 or may reside in part or in whole in another stationary computer system or platform in operative communication with the CME component 130 as indicated by the ellipses to the left of each of the plurality of data channels. The plurality of channels 132, 134, 136 may comprise logical pathways for real-time (including near real-time) information transfer between a powertrain controller such as the PCU 110 and an optimization engine such as the optimization engine 150. Examples of real-time or near-real-time powertrain data include GPS latitude, GPS longitude, battery voltage, battery current, motor power (electrical, mechanical), current efficiency information, vehicle in front information, driver demand power, vehicle speed, motor speed, engine speed, aftertreatment sensor readings, battery state of charge, transmission current gear, requested gear, miles traveled, instantaneous fuel consumption, component temperatures, component health indices, accelerator pedal, brake pedal, and fault codes, among other examples. The plurality of channels 132, 134, 136 may comprise logical pathways for the transfer of non-real-time data. Examples of non-real-time data include subscription information, powertrain configuration, system ID, dataplate information, calibration ID, software ID, driver, fleet information, and route information, among other examples. The plurality of channels may be logic and implementation agnostic and may be implemented in a single stationary computer system or across multiple stationary computer systems, for example, first data channel 132 may reside on a first cloud hosting system and second data channel 134 may reside on a second cloud hosting system.

Each of the plurality of data channels may include a unique ID which may be further tied to one or more particular powertrains and/or to one or more particular data types. In a further aspect, the plurality of channels may be classified by the types of data that each channel receives, stores, and transmits. For example, data channel 132 may be a powertrain to infrastructure data channel configured to receive data from one or more powertrains and transmit data to one or more stationary computer systems. Data channel 134 may be an infrastructure to powertrain data channel configured to receive data from one or more stationary computer systems and transmit data to one or more powertrains. Additional data channels 136 may be any of a number of additional types of data channels, for example, a powertrain to powertrain data channel configured to receive data from one or more powertrains and transmit data to one or more other powertrains, or an information data channel. Each of the plurality of data channels may be encrypted, although an information data channel may be provided as an unencrypted public data channel in some implementations. Each of the plurality of data channels may be classified by powertrain type.

The plurality of data channels may store a number of types of data including on-board powertrain data, powertrain location data such as global position sensor information, current powertrain parameters, current powertrain software, predicted information stored on the powertrain control module, other data from devices not connected to the powertrain, and time stamp data based on a standardized reference time such GMT among other types of data.

The plurality of data channels may have more than one device requesting read or write data access to or from it simultaneously. Once data is written on one of a plurality of data channels, it may be simultaneously available to all devices which subscribe to the channel with a latency of <250-1000 milliseconds or faster. The plurality of data channels may contain both static and dynamic powertrain information. Such information may be non-transitory or non-volatile such that once data is written onto the channel it is stored for a retention period defined by the channel creator, e.g., until at least the next channel update.

The channel management engine may be implemented across or among multiple components. For example, in the illustrated embodiment the functionality of the channel management engine may be considered to be distributed across or among CME component 113 and CME component 130. In other embodiments, the functionality of the channel management engine may be considered to be distributed across additional instances of the CME component 113 and/or the CME component Each CME component has access to all the channels that are currently active. The CME components may collectively or individually decide if a data read or write from the channel is successful or not. The read/write interface for the plurality of channels may be configurable to multiple interfaces such as HTTP, MQTT, or other protocols.

The CME components may participate in arbitration between devices and services which are requesting read-write access to a channel. The CME component 113 may be configured to enable pre-defined channel communication for the PCU 110, for example, to or from powertrain-to-infrastructure and infrastructure-to-powertrain channels available with respect to each powertrain. The CME component 113 may communicate with an advanced driver assistance system interface specification (ADASIS) re-constructor to convert data from the data channels to an ADASIS format which can be used by other devices on the CAN network connected to the powertrain control module. The CME component 130 may be configured to enable pre-defined channel communication for the Optimization engine 150, for example, to or from powertrain-to-infrastructure and infrastructure-to-powertrain channels available with respect to each powertrain. The CME component 130 may also be configured to enable data flow between two or more channels.

In certain embodiment, the CME components may be configured to provide arbitration between devices and services which are requesting read-write access to each of a plurality of data channels in accordance with a polling rate or update rate arbitration technique. For example, the CME components may be configured to dynamically update the first data channel at a first update rate and to dynamically update the second data channel at a second update rate slower than the first update rate. The difference between the first update rate and the second update rate may be selected to ensure that the optimization engine 152 which may execute at a fixed time interval consistent with the refresh rate is provided with operational data from the PCU 110 which is updated at a more frequent rate. The first update rate is on the order of tens of milliseconds, for example, 10-20 milliseconds. The second update rate may be on the order of hundreds of milliseconds, for example, 250-500 milliseconds.

It shall be appreciated that a CME may be configured to arbitrate or broker conflicting signals published by two or more powertrain control units. For example, data may be sorted as they arrive in a time-stamped manner. In some forms, the least significant digit of the timestamp may be evaluated to provide priority resolution of the time-stamp. In case of a tie (e.g., same timestamp including the least significant digit), the tiebreaker may be resolved by adding incrementing the last significant digit to offset the data based on a value indicating powertrain type (e.g., pre-ranked) or customer subscription type (e.g., paid versus free subscription). The CME may have knowledge of all powertrains and all channels in the publish/subscribe model The CME components may be configured to control read access to the plurality of data channels 132, 134, 136 by limiting such access to requesting nodes or devices that have been previously registered and validated by the channel management engine. The CME components may also be configured to control write access to the data channels, for example, to limit write access to the data channel 132 to the powertrain controller 110 and to limit write access to the second data channel to the optimization engine 150.

Figure 2:
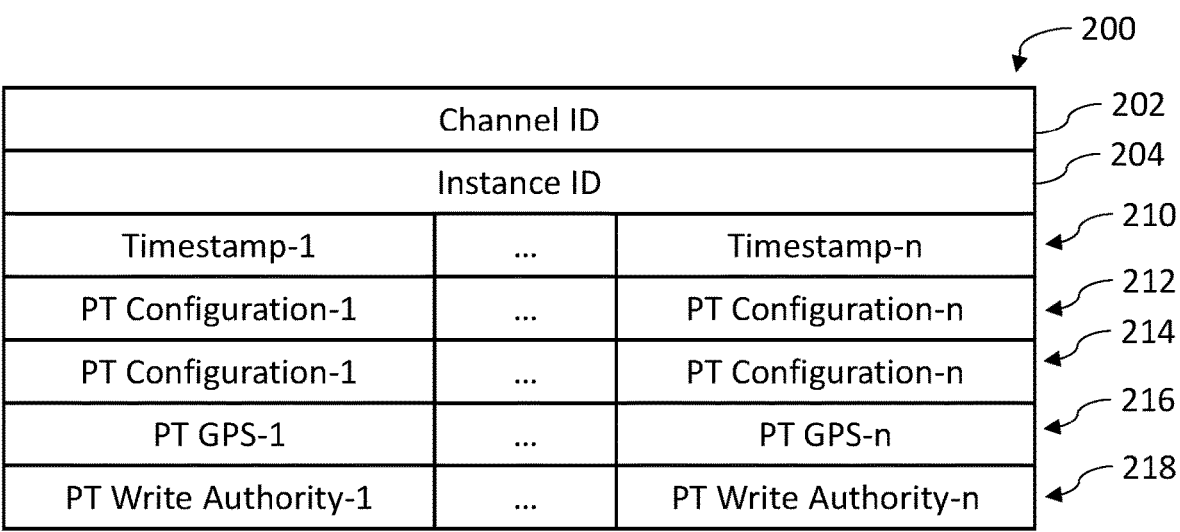
FIGS. 2-4 are schematic diagrams illustrating certain aspects of example data channels.

With reference to FIG. 2, there are illustrated certain data structure aspects of an example powertrain-to-infrastructure data channel 200. It shall be appreciated that data channel 132 may be configured as a powertrain-to-infrastructure data channel in accordance with one or more aspects of data channel 200. Data channel 200 includes a channel ID 202 uniquely identifying the data channel 200, and an instance ID 204 uniquely identifying an instance of the data channel 200. As indicated by the columnar arrangement of data channel 200, channel ID 202 and instance ID 204 may be common denominators for all data of data channel 200.

Data channel 200 further includes one or more timestamps 210 identifying a time that the first data channel was last updated relative to respective powertrain controller, one or more powertrain IDs 212 uniquely identifying one or more respective powertrains or powertrain controllers, one or more a powertrain configurations 214 identifying powertrain and/or vehicle configuration for one or more respective powertrains/vehicles, and one or more powertrain locations 216 identifying a location of one or more respective powertrains at the time that the first data channel was last updated. Data channel 200 may also include one or more powertrain write authorizations 218 identifying a respective powertrain with authorization to write to data channel 200 or a portion thereof. As indicated by the columnar arrangement of data channel 200, timestamps 210, powertrain IDs 212, powertrain configurations 214, powertrain locations 216, and powertrain write authorizations 218 may be divided into portions or regions of the data channel 200 which are specific to particular powertrains or particular powertrain controllers, for example, where data channel 200 services multiple powertrains or powertrain controllers.

Figure 3:
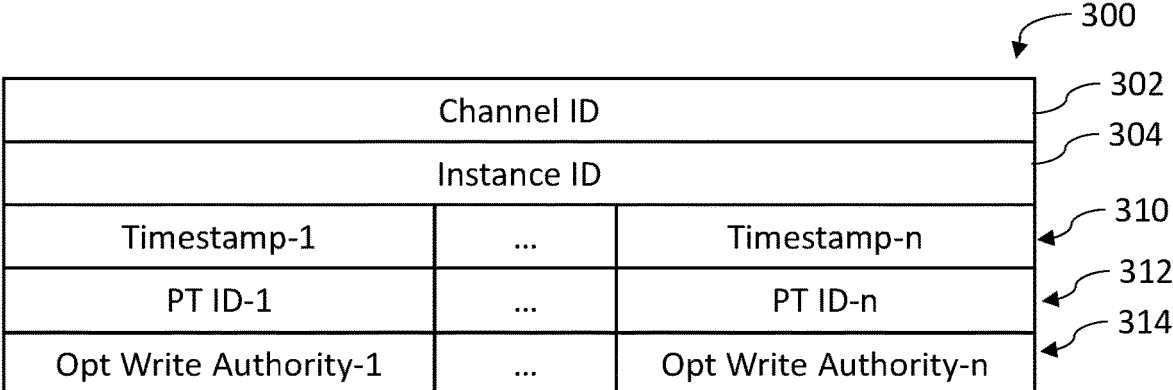

With reference to FIG. 3, there are illustrated certain data structure aspects of an example infrastructure-to-powertrain data channel 300. It shall be appreciated that data channel 134 may be configured as an infrastructure-to-powertrain in accordance with one or more aspects of data channel 300. Data channel 300 includes a channel ID 302 uniquely identifying the data channel 300, and an instance ID 304 uniquely identifying an instance of the data channel 200. As indicated by the columnar arrangement of data channel 200, channel ID 202 and instance ID 204 may be common denominators for all data of data channel 200.

Data channel 300 further includes one or more timestamps 310 identifying a time that the first data channel was last updated relative to respective powertrain controller, one or more powertrain IDs 312 uniquely identifying one or more respective powertrains or powertrain controllers, and one or more optimization write authorizations 314 identifying a respective optimization components of optimization engine with authority to write to data channel 300 or a portion thereof. As indicated by the columnar arrangement of data channel 300, timestamps 310, powertrain IDs 312, and optimization write authorizations 314 may be divided into portions or regions of the data channel 200 which are specific to particular powertrains or particular powertrain controllers, for example, where data channel 200 services multiple powertrains or powertrain controllers.

Figure 4:
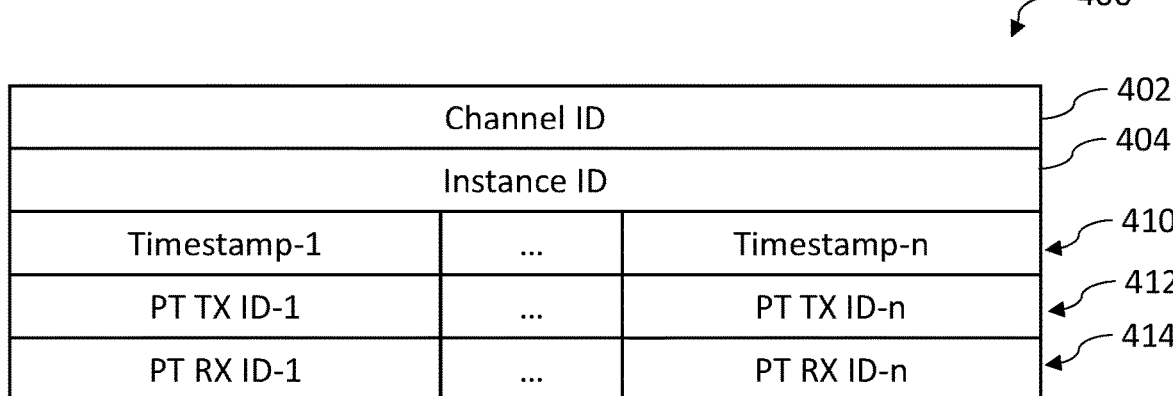

With reference to FIG. 4, there are illustrated certain data structure aspects of an example powertrain-to-powertrain data channel 400. It shall be appreciated that data channel 136 may be configured as a powertrain-to-powertrain data channel in accordance with one or more aspects of data channel 400. Data channel 400 includes a channel ID 402 uniquely identifying the data channel 400, and an instance ID 404 uniquely identifying an instance of the data channel 200. As indicated by the columnar arrangement of data channel 200, channel ID 402 and instance ID 404 may be common denominators for all data of data channel 400.

Data channel 400 further includes one or more time-stamps 410 identifying a time that the first data channel was last updated relative to respective powertrain controller, one or more transmitting powertrain IDs 412 uniquely identifying one or more respective powertrains or powertrain controllers transmitting a powertrain-to-powertrain communication, and one or more receiving powertrain IDs 414 uniquely identifying one or more respective powertrains or powertrain controllers receiving a powertrain-to-powertrain communication. As indicated by the columnar arrangement of data channel 400, timestamps 410, transmitting powertrain IDs 412, and receiving powertrain IDs 414 may be divided into portions or regions of the data channel 400 which are specific to particular powertrains or particular powertrain controllers, for example, where data channel 400 services multiple powertrains or powertrain controllers.

Figure 5:
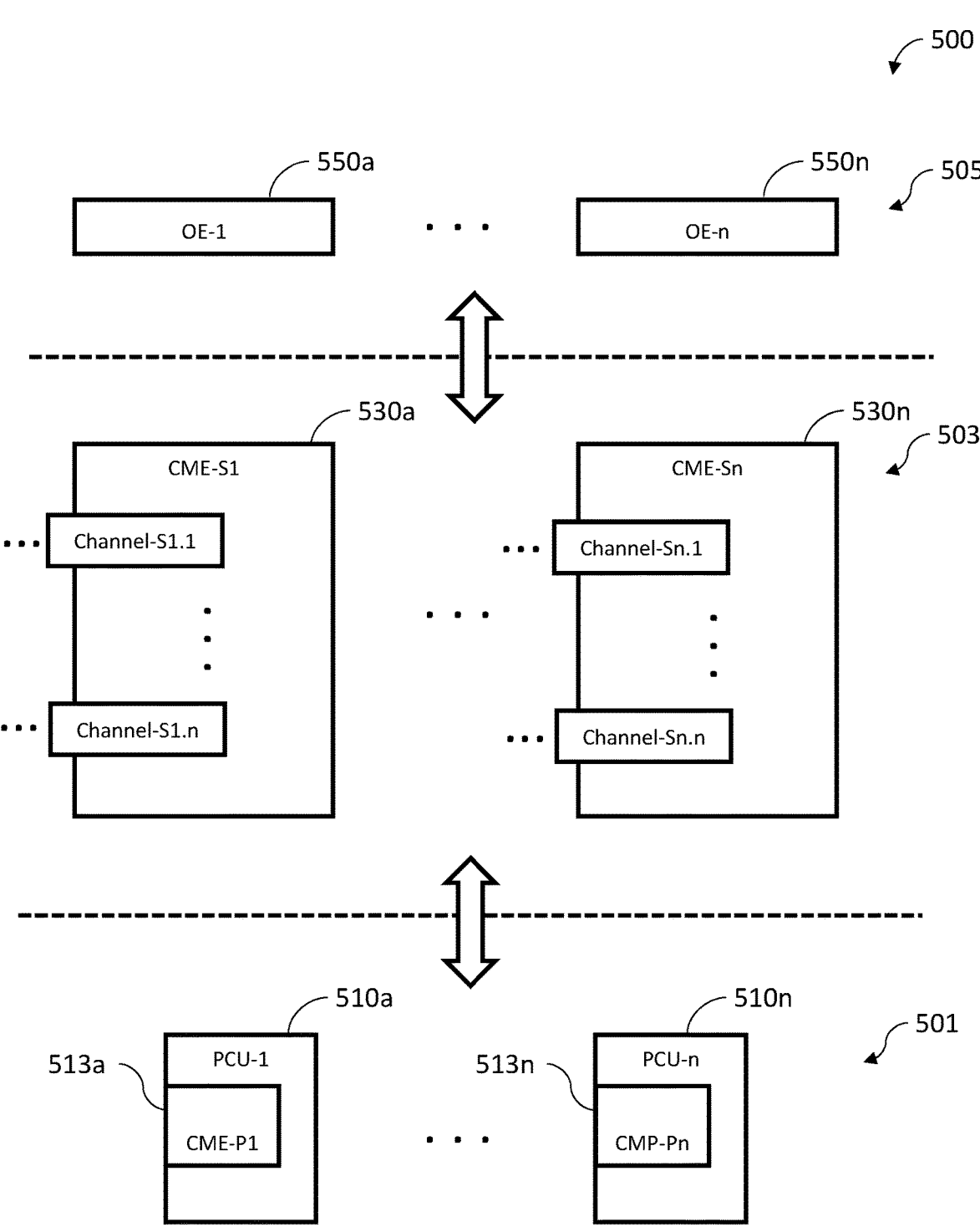
FIG. 5 is a schematic diagram illustrating certain aspects of an example powertrain performance optimization system.

With reference to FIG. 5, there is illustrated an example distributed powertrain performance optimization system 500 which is also referred to herein as system 500. System 500 includes a powertrain/vehicle layer 501 which may be referred to as layer 501, a stationary channel management engine layer 503 which may be referred to as layer 503, and a stationary optimization layer 505 which may be referred to as layer 505.

Layer 501 includes a dynamically variable number of powertrain control units (PCUs) 510a-150n which are configured to control operation of respective powertrains and which include or are operatively coupled with respective channel management engine (CME) components 513a-513n which are configured to manage aspects of their respective PCUs 510a-510n reading data from and writing data to a plurality of data channels. Each of PCUs 510a-510n may have the components, functionalities, communication capabilities, and relationships with data channels, powertrains, vehicles, transceivers, and other features and components that are the same as or similar to those of PCU 110 of system 100. Each of CME components 513a-513n may have the components, functionalities, communication capabilities, and relationships with data channels, powertrains, vehicles, transceivers, and other features and components that are the same as or similar to those of CME component 113 of system 100.

The number of PCUs 510a-150n may, in theory, be any number of one or more; however, in certain implementations, a maximum number of PCUs 510a-150n may be established to ensure acceptable performance in view of the available communication bandwidth or computational resources. During operation of system 500, any of the PCUs 510a-150n which have been previously registered with and are recognized by the system 500 may dynamically join or leave the system 500, for example, as powertrain controllers turn on and off. Registration and recognition may occur offline and may be configured to require a trusted source to ensure that only desired powertrain control units are able to access and participate in the system 500.

Layer 503 includes a dynamically variable number of stationary channel management engine (CME) components 530a-530n which are configured to dynamically update a plurality of data channels including. Each of CME components 530a-530n may have the components, functionalities, communication capabilities, and relationships with powertrains, vehicles, transceivers, and other features and components that are the same as or similar to those of CME component 130 of system 100.

The number of CME components 530a-530n may, in theory, be any number of one or more; however, in certain implementations a maximum number of CME components 530a-530n may be established to ensure acceptable performance in view of the available communication bandwidth or computational resources. During operation of system 500, any of the CME components 530a-530n which have been previously registered with and are recognized by the system 500 may dynamically join or leave the system 500, for example, as their respective computing systems turn on or off. Registration and recognition may occur offline and may be configured to require a trusted source to ensure that only desired powertrain control units are able to access and participate in the system 500.

Layer 505 includes a dynamically variable number of stationary optimization engines 550a-550n which are configured to dynamically determine optimized powertrain operation parameters for one or more respective PCUs 510a-150n. Each of stationary optimization engines 550a-550n may have the components, functionalities, communication capabilities, and relationships with powertrains, vehicles, transceivers, and other features and components that are the same as or similar to those of optimization engine 150 of system 100.

The number of optimization engines 550a-550n may, in theory, be any number of one or more; however, in certain implementations, a maximum number of optimization engines 550a-550n may be established to ensure acceptable performance in view of the available communication bandwidth or computational resources. During operation of system 500, any of the optimization engines 550a-550n which have been previously registered with and are recognized by the system 500 may dynamically join or leave the system 500, for example, as their respective computing systems turn on or off. Registration and recognition may occur offline and may be configured to require a trusted source to ensure that only desired powertrain control units are able to access and participate in the system 500.

System 500 is an example of a distributed powertrain performance optimization system which may include a plurality of instances of the channel management engine component which may be provided in one or more common or separate stationary computer system remote from the powertrain controller and are configured for bidirectional communication with the powertrain controller and the optimization engine. In such forms management of the plurality of data channels by the channel management engine and the second instance of the channel management engine may be coordinated using a number of techniques. For example, in the case of multiple CME instances, where each CME arbitrates a maximum number of powertrain controllers and algorithm instances, such as a distributed implementation, the CMEs periodically exchange information on the powertrain(s) that they have registered. In this form, the channels managed by the two CMEs will be separate and two CMEs will not handle data for the same powertrain. Thus, the second, third, fourth instances of CME are configured to operate as a multi-master system serving independent powertrain assets. The incoming requests are processed and once a powertrain is registered with a said CME, and no other CME attempts to register that powertrain.

System 500 is an example of a distributed powertrain performance optimization system which may include a plurality of powertrain controllers operatively coupled with and configured to control operation of a second powertrain of a second vehicle and for bidirectional wireless communication. In such forms, a first data channel may store a plurality of non-transitory dynamically-updated instances of powertrain operation data received from a respective plurality of powertrain controller. For example, the first data channel may store a first non-transitory dynamically-updated instance of first powertrain operation data received from a first powertrain controller and a second non-transitory dynamically-updated instance of second powertrain operation data received from a second powertrain controller.

In such forms, a first data channel may store a plurality of dynamically-updated instances of optimized powertrain operation parameters for a respective plurality of powertrain controller. For example, the second data channel may store first non-transitory dynamically-updated instance of first optimized powertrain operation parameters for a first powertrain controller and second optimized powertrain operation parameters for a second powertrain controller.

A number of example embodiments shall now be further described. A first example embodiment is a system comprising: a powertrain controller operatively coupled with and configured to control operation of a powertrain of a vehicle and for bidirectional communication via a wireless communication path; a network device operatively coupled with the powertrain controller and configured to provide the wireless communication path, to connect to one or more of a plurality of dynamic data channels configured to contain real-time data and non-real-time powertrain data published by the powertrain controller and the network device, and to arbitrate writing of the real-time data and the non-real time data to the one or more dynamic data channels; an optimization engine provided in a stationary computer system remote from the powertrain controller configured to determine optimized powertrain operation parameters for the powertrain controller; and a channel management engine provided in at least one of said stationary computer system and a second stationary computer system remote from the powertrain controller, configured for bidirectional communication with the powertrain controller via the wireless communication path, and configured to dynamically create, update and delete the plurality of dynamic data-channels.

In some forms of the first example embodiment, the system comprises a data lake provided in a computer system remote from the powertrain controller configured for storing time-stamped data from said channel management engine. In some forms of the first example embodiment, the channel management engine is configured to dynamically update a first data channel at a first update rate and to dynamically update a second data channel at a second update rate slower than the first update rate. In some forms of the first example embodiment, one or both of: (a) the first update rate is on the order of tens of milliseconds, and (b) the second update rate is on the order of hundreds of milliseconds. In some forms of the first example embodiment, one or both of: (a) the first update rate is 10-20 milliseconds, and (b) the second update rate is 250-500 milliseconds. In some forms of the first example embodiment, at least one of: (a) the channel management engine is configured to limit write access to the first data channel to the powertrain controller, and (b) the channel management engine is configured to limit write access to the second data channel to the optimization engine. In some forms of the first example embodiment, the system comprises a second instance of the channel management engine provided in a third stationary computer system remote from the powertrain controller and configured for bidirectional communication with the powertrain controller and the optimization engine. In some forms of the first example embodiment, management of the plurality of data channels by the channel management engine and the second instance of the channel management engine is coordinated by uniquely registering the powertrain controller with a single one of the first instance of the channel management engine and the second instance of the channel management engine. In some forms of the first example embodiment, the system comprises a second powertrain controller operatively coupled with and configured to control operation of a second powertrain of a second vehicle and for bidirectional wireless communication, wherein at least one of: (a) the first data channel stores a second non-transitory dynamically-updated instance of second powertrain operation data received from the second powertrain controller, and (b) the second data channel stores a second a non-transitory dynamically-updated instance of second optimized powertrain operation parameters for the second powertrain controller. In some forms of the first example embodiment, at least one of: (a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated. In some forms of the first example embodiment, the plurality of data channels includes a third data channel storing data for powertrain-to-powertrain communication.

A second example embodiment is a system comprising: a powertrain controller operatively coupled with and configured to control operation of a powertrain of a vehicle and for bidirectional communication via a wireless communication path; an optimization engine provided in a stationary computer system remote from the powertrain controller and configured to determine optimized powertrain operation parameters for the powertrain controller and for bidirectional communication via a second communication path; and a channel management engine provided in at least one of said stationary computer system and a second stationary computer system remote from the powertrain controller and configured for bidirectional communication with the powertrain controller via the wireless communication path and for bidirectional communication with the optimization engine via the second communication path, the channel management engine configured to dynamically update a plurality of data channels including a first data channel storing a non-transitory dynamically-updated instance of powertrain operation data received from the powertrain controller, and a second data channel storing a non-transitory dynamically-updated instance of optimized powertrain operation parameters received from the optimization engine.

In some forms of the second example embodiment, the channel management engine is configured to dynamically update the first data channel at a first update rate and to dynamically update the second data channel at a second update rate slower than the first update rate. In some forms of the second example embodiment, one or both of: (a) the first update rate is on the order of tens of milliseconds, and (b) the second update rate is on the order of hundreds of milliseconds. In some forms of the second example embodiment, one or both of: (a) the first update rate is 10-20 milliseconds, and (b) the second update rate is 250-500 milliseconds. In some forms of the second example embodiment, at least one of: (a) the channel management engine is configured to limit write access to the first data channel to the powertrain controller, and (b) the channel management engine is configured to limit write access to the second data channel to the optimization engine. In some forms of the second example embodiment, the system comprises a second instance of the channel management engine provided in a third stationary computer system remote from the powertrain controller and configured for bidirectional communication with the powertrain controller and the optimization engine. In some forms of the second example embodiment, management of the plurality of data channels by the channel management engine and the second instance of the channel management engine is coordinated by uniquely registering the powertrain controller with a single one of the first instance of the channel management engine and the second instance of the channel management engine. In some forms of the second example embodiment, the system comprises a second powertrain controller operatively coupled with and configured to control operation of a second powertrain of a second vehicle and for bidirectional wireless communication, wherein at least one of: (a) the first data channel stores a second non-transitory dynamically-updated instance of second powertrain operation data received from the second powertrain controller, and (b) the second data channel stores a second a non-transitory dynamically-updated instance of second optimized powertrain operation parameters for the second powertrain controller. In some forms of the second example embodiment, at least one of: (a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated. In some forms of the second example embodiment, the plurality of data channels includes a third data channel storing data for powertrain-to-powertrain communication.

A third example embodiment is a method comprising: providing a system including a powertrain controller, a network device operatively coupled with the powertrain controller, an optimization engine provided in a stationary computer system remote from the powertrain controller, a channel management engine provided in at least one of said stationary computer system and a second stationary computer system remote from the powertrain controller, and a data lake provided in a computer system remote from the powertrain controller; and operating the network device operatively to connect to one or more of a plurality of dynamic data channels configured to contain real-time data and non-real-time powertrain data published by the powertrain controller and the network device, and to arbitrate writing of the real-time data and the non-real time data to the one or more dynamic data channels.

In some forms of the third example embodiment, the method comprises operating the channel management engine to dynamically one or more of create, update, and delete the plurality of dynamic data-channels. In some forms of the third example embodiment, the method comprises operating the optimization engine to determine optimized powertrain operation parameters for the powertrain controller. In some forms of the third example embodiment, the method comprises operating the powertrain controller to control operation of a powertrain of a vehicle in response to the optimized powertrain operation parameters. In some forms of the third example embodiment, the method comprises storing time-stamped data from said channel management engine in the data lake. In some forms of the third example embodiment, the channel management engine dynamically updates a first data channel at a first update rate and dynamically updates a second data channel at a second update rate slower than the first update rate. In some forms of the third example embodiment, one or both of: (a) the first update rate is on the order of tens of milliseconds, and (b) the second update rate is on the order of hundreds of milliseconds. In some forms of the third example embodiment, one or both of: (a) the first update rate is 10-20 milliseconds, and (b) the second update rate is 250-500 milliseconds. In some forms of the third example embodiment, at least one of: (a) the channel management engine limits write access to the first data channel to the powertrain controller, and (b) the channel management engine limits write access to the second data channel to the optimization engine. In some forms of the third example embodiment, the method comprises providing a second instance of the channel management engine in a third stationary computer system remote from the powertrain controller and configured for bidirectional communication with the powertrain controller and the optimization engine. In some forms of the third example embodiment, the method comprises coordinating management of the plurality of data channels by the channel management engine and the second instance of the channel management engine by uniquely registering the powertrain controller with a single one of the first instance of the channel management engine and the second instance of the channel management engine. In some forms of the third example embodiment, the method comprises operating a second powertrain controller operatively coupled with and configured to control operation of a second powertrain of a second vehicle and for bidirectional wireless communication, and at least one of: (a) storing with the first data channel a second non-transitory dynamically-updated instance of second powertrain operation data received from the second powertrain controller, and (b) storing with the second data channel a second a non-transitory dynamically-updated instance of second optimized powertrain operation parameters for the second powertrain controller. In some forms of the third example embodiment, the method comprises at least one of: (a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated. In some forms of the third example embodiment, the plurality of data channels includes a third data channel storing data for powertrain-to-powertrain communication.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
a powertrain controller operatively coupled with and configured to control operation of a powertrain of a vehicle and for bidirectional communication via a wireless communication path;
a network device operatively coupled with the powertrain controller and configured to provide the wireless communication path, to connect to one or more of a plurality of dynamic data channels configured to contain real-time data and non-real-time powertrain data published by the powertrain controller and the network device, and to arbitrate writing of the real-time data and the non-real time data to the one or more dynamic data channels;

an optimization engine provided in a stationary computer system remote from the powertrain controller configured to determine optimized powertrain operation parameters for the powertrain controller; and
a channel management engine provided in at least one of said stationary computer system and a second stationary computer system remote from the powertrain controller, configured for bidirectional communication with the powertrain controller via the wireless communication path, and configured to dynamically create, update and delete the plurality of dynamic data-channels.

2. The system of claim 1 comprising:
a data lake provided in a computer system remote from the powertrain controller configured for storing timestamped data from said channel management engine.

3. The system of claim 1 wherein the channel management engine is configured to dynamically update a first data channel at a first update rate and to dynamically update a second data channel at a second update rate slower than the first update rate.

4. The system of claim 3 wherein one or both of: (a) the first update rate is on the order of tens of milliseconds, and (b) the second update rate is on the order of hundreds of milliseconds.

5. The system of claim 3 wherein one or both of: (a) the first update rate is 10-20 milliseconds, and (b) the second update rate is 250-500 milliseconds.

6. The system of claim 3 wherein at least one of: (a) the channel management engine is configured to limit write access to the first data channel to the powertrain controller, and (b) the channel management engine is configured to limit write access to the second data channel to the optimization engine.

7. The system of claim 1 comprising a second instance of the channel management engine provided in a third stationary computer system remote from the powertrain controller and configured for bidirectional communication with the powertrain controller and the optimization engine.

8. The system of claim 7 wherein management of the plurality of data channels by the channel management engine and the second instance of the channel management engine is coordinated by uniquely registering the powertrain controller with a single one of the first instance of the channel management engine and the second instance of the channel management engine.

9. The system of claim 3 comprising a second powertrain controller operatively coupled with and configured to control operation of a second powertrain of a second vehicle and for bidirectional wireless communication, wherein at least one of:
(a) the first data channel stores a second non-transitory dynamically-updated instance of second powertrain operation data received from the second powertrain controller, and
(b) the second data channel stores a second a non-transitory dynamically-updated instance of second optimized powertrain operation parameters for the second powertrain controller.

10. The system of claim 3 wherein at least one of:
(a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated.

11. The system of claim 1 wherein the plurality of data channels includes a third data channel storing data for powertrain-to-powertrain communication.

12. A system comprising:

a powertrain controller operatively coupled with and configured to control operation of a powertrain of a vehicle and for bidirectional communication via a wireless communication path;

an optimization engine provided in a stationary computer system remote from the powertrain controller and configured to determine optimized powertrain operation parameters for the powertrain controller and for bidirectional communication via a second communication path; and a channel management engine provided in at least one of said stationary computer system and a second stationary computer system remote from the powertrain controller and configured for bidirectional communication with the powertrain controller via the wireless communication path and for bidirectional communication with the optimization engine via the second communication path, the channel management engine configured to dynamically update a plurality of data channels including a first data channel storing a non-transitory dynamically-updated instance of powertrain operation data received from the powertrain controller, and a second data channel storing a non-transitory dynamically-updated instance of optimized powertrain operation parameters received from the optimization engine.

13. The system of claim 12 wherein the channel management engine is configured to dynamically update the first data channel at a first update rate and to dynamically update the second data channel at a second update rate slower than the first update rate.

14. The system of claim 13 wherein one or both of: (a) the first update rate is on the order of tens of milliseconds, and (b) the second update rate is on the order of hundreds of milliseconds.

15. The system of claim 14 wherein one or both of: (a) the first update rate is 10-20 milliseconds, and (b) the second update rate is 250-500 milliseconds.

16. The system of claim 12 wherein at least one of: (a) the channel management engine is configured to limit write access to the first data channel to the powertrain controller, and (b) the channel management engine is configured to limit write access to the second data channel to the optimization engine.

17. The system of claim 12 comprising a second instance of the channel management engine provided in a third stationary computer system remote from the powertrain controller and configured for bidirectional communication with the powertrain controller and the optimization engine.

18. The system of claim 17 wherein management of the plurality of data channels by the channel management engine and the second instance of the channel management engine is coordinated by uniquely registering the powertrain controller with a single one of the first instance of the channel management engine and the second instance of the channel management engine.

19. The system of claim 12 comprising a second powertrain controller operatively coupled with and configured to control operation of a second powertrain of a second vehicle and for bidirectional wireless communication, wherein at least one of:

(a) the first data channel stores a second non-transitory dynamically-updated instance of second powertrain operation data received from the second powertrain controller, and (b) the second data channel stores a second a non-transitory dynamically-updated instance of second optimized powertrain operation parameters for the second powertrain controller.

20. The system of claim 12 wherein at least one of:

(a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated.

21. The system of claim 12 wherein the plurality of data channels includes a third data channel storing data for powertrain-to-powertrain communication.

22. A method comprising:

providing a system including a powertrain controller, a network device operatively coupled with the powertrain controller, an optimization engine provided in a stationary computer system remote from the powertrain controller, a channel management engine provided in at least one of said stationary computer system and a second stationary computer system remote from the powertrain controller, and a data lake provided in a computer system remote from the powertrain controller; and operating the network device operatively to connect to one or more of a plurality of dynamic data channels configured to contain real-time data and non-real-time powertrain data published by the powertrain controller and the network device, and to arbitrate writing of the real-time data and the non-real time data to the one or more dynamic data channels.

23. The method of claim 22 comprising:

operating the channel management engine to dynamically one or more of create, update, and delete the plurality of dynamic data-channels.

24. The method of claim 22 comprising:

operating the optimization engine to determine optimized powertrain operation parameters for the powertrain controller.

25. The method of claim 24 comprising:

operating the powertrain controller to control operation of a powertrain of a vehicle in response to the optimized powertrain operation parameters.

26. The method of claim 22 comprising:

storing time-stamped data from said channel management engine in the data lake.

27. The method of claim 22 wherein the channel management engine dynamically updates a first data channel at a first update rate and dynamically updates a second data channel at a second update rate slower than the first update rate.

28. The method of claim 27 wherein one or both of: (a) the first update rate is on the order of tens of milliseconds, and (b) the second update rate is on the order of hundreds of milliseconds.

29. The method of claim 27 wherein one or both of: (a) the first update rate is 10-20 milliseconds, and (b) the second update rate is 250-500 milliseconds.

30. The method of claim 27 wherein at least one of: (a) the channel management engine limits write access to the first data channel to the powertrain controller, and (b) the channel management engine limits write access to the second data channel to the optimization engine.

31. The method of claim 22 comprising providing a second instance of the channel management engine in a third stationary computer system remote from the powertrain controller and configured for bidirectional communication with the powertrain controller and the optimization engine.

32. The method of claim 31 comprising coordinating management of the plurality of data channels by the channel management engine and the second instance of the channel management engine by uniquely registering the powertrain controller with a single one of the first instance of the channel management engine and the second instance of the channel management engine.

33. The method of claim 27 comprising operating a second powertrain controller operatively coupled with and configured to control operation of a second powertrain of a second vehicle and for bidirectional wireless communication, and at least one of:

(a) storing with the first data channel a second non-transitory dynamically-updated instance of second powertrain operation data received from the second powertrain controller, and (b) storing with the second data channel a second a non-transitory dynamically-updated instance of second optimized powertrain operation parameters for the second powertrain controller.

34. The method of claim 27 wherein at least one of:

(a) the first data channel includes: a channel ID uniquely identifying the first data channel, an instance ID uniquely identifying an instance of the first data channel, a timestamp identifying a time that the first data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated, and (b) the second data channel includes: a channel ID uniquely identifying the second data channel, an instance ID uniquely identifying an instance of the second data channel, a timestamp identifying a time that the second data channel was last updated, a powertrain ID uniquely identifying the powertrain, a powertrain configuration identifying configuration data of at least one of the powertrain and the vehicle, and a powertrain location identifying a location of the powertrain at the time that the first data channel was last updated.

35. The method of claim 22 wherein the plurality of data channels includes a third data channel storing data for powertrain-to-powertrain communication.

* * * * *